US012340566B2

United States Patent
Ma et al.

(10) Patent No.: US 12,340,566 B2
(45) Date of Patent: Jun. 24, 2025

(54) MULTI-VIEW FINE-GRAINED IDENTIFICATION METHOD, APPARATUS, ELECTRONIC DEVICE AND MEDIUM

(71) Applicant: BEIJING UNIVERSITY OF POSTS AND TELECOMMUNICATIONS, Beijing (CN)

(72) Inventors: Zhanyu Ma, Beijing (CN); Kongming Liang, Beijing (CN); Ruoyi Du, Beijing (CN); Wenqing Yu, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 337 days.

(21) Appl. No.: 18/135,525

(22) Filed: Apr. 17, 2023

(65) Prior Publication Data
US 2024/0037918 A1 Feb. 1, 2024

(30) Foreign Application Priority Data
Jul. 26, 2022 (CN) .......................... 202210887082.0

(51) Int. Cl.
*G06V 10/774* (2022.01)
*G06V 10/764* (2022.01)
*G06V 10/776* (2022.01)

(52) U.S. Cl.
CPC .......... *G06V 10/774* (2022.01); *G06V 10/764* (2022.01); *G06V 10/776* (2022.01)

(58) Field of Classification Search
CPC .. G06V 10/774; G06V 10/764; G06V 10/776; G06V 20/56; G06V 10/82;
(Continued)

(56) References Cited

U.S. PATENT DOCUMENTS 10,453,197 B1 * 10/2019 Cholakkal ............ G06V 10/454
10,534,960 B2 * 1/2020 Perona ...................... G06T 7/74
(Continued)

OTHER PUBLICATIONS

Second Office Action for Chinese Application No. 202210887082.0, dated Jul. 11, 2023, 13 Pages (including English translation).
(Continued)

*Primary Examiner* — Michael S Osinski
(74) *Attorney, Agent, or Firm* — BROOKS KUSHMAN P.C.

(57) ABSTRACT

A multi-view fine-grained identification method, apparatus, electronic device and medium. By applying the technical scheme of the application, an initial classification model can be trained by using a sample data set consisting of multi-view images of a plurality of multi-view samples. Thus, an efficient fine-grained identification model can be obtained, and this model can actively select the next view image of the same sample for image identification. On the one hand, by aggregating information of multi-view images of the same sample, the limitation of traditional fine-grained image identification methods that only rely on a single picture to provide clues for discrimination is solved. On the other hand, by predicting view images for discrimination, identification efficiency based on multi-view fine-grained identification is improved.

18 Claims, 3 Drawing Sheets

(58) Field of Classification Search
CPC ...... G06V 20/10; G06V 10/25; G06V 10/454; G06V 10/26; G06V 10/462; G06V 20/41; G06V 10/803; G06V 10/806; G06V 20/64; G06V 10/44; G06V 10/464; G06V 10/7715; G06N 3/045; G06N 3/08; G06N 3/04; G06N 3/044; G06N 3/0464; G06N 3/084; G06N 3/048; G06T 2207/20084; G06T 2207/20081; G06T 2207/30252; G06T 7/74; G06T 2207/10032; G06T 2207/20076; G06T 2207/30184; G06F 18/214; G06F 18/2413; G06F 18/254; G06F 18/24; G06F 18/2431; G06F 18/253

See application file for complete search history.

(56) References Cited

U.S. PATENT DOCUMENTS

| | | | | |
|---|---|---|---|---|
| 10,733,480 | B2 * | 8/2020 | Kumar | G06V 10/25 |
| 11,023,730 | B1 * | 6/2021 | Zhou | G06V 10/764 |
| 11,423,651 | B2 * | 8/2022 | Uhlenbrock | G06N 3/045 |
| 11,501,518 | B2 * | 11/2022 | Ma | G06F 18/253 |
| 11,651,602 | B1 * | 5/2023 | Tschernezki | G06V 10/803 |
| | | | | 382/157 |
| 11,676,182 | B2 * | 6/2023 | Frei | G06Q 30/0283 |
| | | | | 382/190 |
| 11,783,384 | B2 * | 10/2023 | Porter | G06V 20/41 |
| | | | | 382/190 |
| 11,954,917 | B2 * | 4/2024 | Pang | G06V 10/26 |
| 12,039,766 | B2 * | 7/2024 | Feng | G06V 10/82 |
| 12,223,549 | B2 * | 2/2025 | Bouëtté | G06Q 40/08 |
| 2016/0140424 | A1 * | 5/2016 | Wang | G06F 18/2414 |
| | | | | 382/156 |
| 2017/0124433 | A1 * | 5/2017 | Chandraker | G06N 3/045 |
| 2017/0256068 | A1 * | 9/2017 | Wang | G06T 7/337 |
| 2017/0287170 | A1 * | 10/2017 | Perona | G06V 20/56 |
| 2018/0250826 | A1 * | 9/2018 | Jiang | G06V 10/25 |
| 2022/0147738 | A1 * | 5/2022 | Huang | G06V 10/774 |
| 2023/0102113 | A1 * | 3/2023 | Magistri | G06V 20/58 |
| | | | | 382/103 |
| 2023/0141145 | A1 * | 5/2023 | Hong | G06N 3/082 |
| | | | | 706/26 |
| 2023/0281966 | A1 * | 9/2023 | Vecerik | G06V 20/647 |
| | | | | 382/157 |
| 2023/0377047 | A1 * | 11/2023 | Bouëtté | G06V 10/82 |
| 2024/0062532 | A1 * | 2/2024 | Savvides | G06V 10/462 |

OTHER PUBLICATIONS

Second Office Action for Chinese Application No. 201610073117.1, dated Jul. 11, 2023, 13 Pages (including English translation).

Du et al., "Multi-View Active Fine-Grained Recognition," Beijing University of Posts and Telecommunications, Jun. 2, 2022, pp. 1-15, ArXiv Preprint: arXiv:2206.01153v1, Beijing, China, 15 Pages.

* cited by examiner

MULTI-VIEW FINE-GRAINED IDENTIFICATION METHOD, APPARATUS, ELECTRONIC DEVICE AND MEDIUM

CROSS REFERENCES TO RELATED APPLICATION

This application claims foreign priority benefits under 35 U.S.C. § 119(a)-(d) to Chinese patent application No. 202210887082.0 filed on Jul. 26, 2022, which is hereby incorporated herein by reference in its entirety.

TECHNICAL FIELD

The application relates to data processing technology, and in particular, relates to a multi-view fine-grained identification method, apparatus, electronic device and medium.

BACKGROUND

With the development of communication and network era, more and more attention has been paid to the application of image classification technology in various application scenarios.

In related technologies, Fine-Grained Visual Classification (FGVC) is dedicated to identifying sub-classes of objects belonging to the same category, and its research has achieved remarkable results, even surpassing human experts in many application scenarios, such as identifying vehicles, aircraft, birds and food.

However, the research on fine-grained visual classification in related technologies is still limited to the framework from a single perspective. This also leads to the lack of clues for discrimination provided by a single picture in fine-grained image identification in some scenes. As a result, the single-view pictures without fine-grained discriminant features are doomed to be unable to be accurately classified, which in turn affects the classification results.

SUMMARY

The embodiment of the application provides a multi-view fine-grained identification method, apparatus, electronic device and medium used for solving the problem of the related art that the classification result is influenced by the fact that a single picture provides less clues for discrimination in fine-grained image identification.

According to one aspect of the embodiment of the application, a multi-view fine-grained identification method is provided, which includes the following steps:

acquiring a sample data set containing a plurality of multi-view samples, wherein each sample contains a plurality of sub-view images shot from different perspectives, and each sample is marked with a corresponding category;

training an initial fine-grained identification model by using the sub-view images corresponding to each sample respectively to acquire a to-be-optimized fine-grained identification model, wherein the to-be-optimized fine-grained identification model is deployed with an aggregator for aggregating output features and a selector for selecting a next sub-view image as a training object;

optimizing and adjusting the to-be-optimized fine-grained identification model based on classification results of the aggregator and the selector until it is determined that the optimization is completed to acquire a trained target fine-grained identification model; and performing image identification on the to-be-classified image by using the target fine-grained identification model.

Optionally, in another embodiment of the method based on the application, training the initial fine-grained identification model by using the sub-view images corresponding to each sample respectively to acquire the to-be-optimized fine-grained identification model includes:

acquiring a first sample in the sample data set;

training the initial fine-grained identification model by using a first sub-view image in the first sample to obtain a first identification feature;

based on the first identification feature, predicting an image category of the first sample while selecting a second sub-view image as a next training object;

training the initial fine-grained identification model by using the second sub-view image until it is determined that all sub-view images in the first sample have been used to train the initial fine-grained identification model; and training the initial fine-grained identification model by using the sub-view images corresponding to the second sample in the sample data set until the to-be-optimized fine-grained identification model is acquired.

Optionally, in another embodiment of the method based on the application, the training the initial fine-grained identification model by using the sub-view images corresponding to each sample respectively to acquire the to-be-optimized fine-grained identification model includes:

training the initial fine-grained identification model by using each sample and a total loss function to acquire the to-be-optimized fine-grained identification model; and wherein, the total loss function is acquired from a sum of a first loss function and a second loss function, wherein the first loss function is a loss function obtained by optimizing cross entropy, and the second loss function is a loss function obtained by performing entropy maximization constraint on selector prediction probability distribution.

Optionally, in another embodiment of the method based on the application, the first loss function is obtained by the following formula:

$$L_{CE}(\hat{l}_i^v, l_i) = l_i \times \log(\hat{l}_i^v);$$

wherein, $L_{CE}(\hat{l}_i^v, l_i)$ represents the first loss function, v is the first sub-view, $l_i$ is the category of the first sample, and $\hat{l}_i^v$ is the prediction probability distribution of the first sub-view.

Optionally, in another embodiment of the method based on the application, the second loss function is obtained by the following formula:

$$L_{EM}(\hat{l}_i^v, \hat{l}_i^{v'}) = |\hat{l}_i^v - \hat{l}_i^{v'}|^2;$$

wherein, $L_{EM}(\hat{l}_i^v, \hat{l}_i^{v'})$ represents the second loss function, v is the first sub-view, $\hat{l}_i^v$ is the prediction probability distribution of the first sub-view, and $\hat{l}_i^{v'}$ is an entropy increasing version of the prediction probability distribution of the first sub-view;

wherein, the value $\hat{l}_{i,j}^v$ of the j-th category of $\hat{l}_i^{v'}$ is obtained by the following formula:

$$\hat{l}_{i,j}^v = \frac{\exp(p_{i,j}^v)/t}{\sum_k \exp(p_{i,k}^v)/t};$$

wherein, t is a temperature coefficient, $p_{i,j}^v$ is a prediction output of the model for the j-th category based on the first sub-view of the first sample.

Optionally, in another embodiment of the method based on the application, optimizing the aggregator and the selector in the to-be-optimized fine-grained identification model includes:

by using a strategic gradient algorithm, optimizing the aggregator and the selector with a prediction probability distribution of the module for a target category based on a new perspective as a reward.

According to another aspect of the embodiment of the application, it is provided a multi-view fine-grained identification apparatus, including:

an acquisition module, configured to acquire a sample data set containing a plurality of multi-view samples, wherein each sample contains a plurality of sub-view images shot from different perspectives, and each sample is marked with a corresponding category;

a training module, configured to train an initial fine-grained identification model by using sub-view images corresponding to each sample respectively to acquire a to-be-optimized fine-grained identification model, wherein the to-be-optimized fine-grained identification model is deployed with an aggregator for aggregating output features and a selector for selecting a next sub-view image as a training object;

an optimization module, configured to optimize and adjust the to-be-optimized fine-grained identification model based on classification results of the aggregator and the selector until it is determined that the optimization is completed to acquire a trained target fine-grained identification model; and an identification module, configured to perform image identification on a to-be-classified image by using the target fine-grained identification model.

According to another aspect of an embodiment of the present application, it is provided an electronic device, including:

a memory, configured to store executable instructions; and a display, configured to execute the executable instructions with the memory so as to complete operations of the multi-view fine-grained identification method according to any one of the above.

According to another aspect of the embodiment of the application, it is provided a computer-readable storage medium configured to store computer-readable instructions, wherein the instructions, when executed, perform the operations of the multi-view fine-grained identification method according to any one of the above.

In the application, a sample data set containing a plurality of multi-view samples can be acquired, wherein each sample contains a plurality of sub-view images shot from different perspectives, and each sample is marked with a corresponding category; an initial fine-grained identification model is trained by using the sub-view images corresponding to each sample respectively to acquire a to-be-optimized fine-grained identification model, wherein the to-be-optimized fine-grained identification model is deployed with an aggregator for aggregating output features and a selector for selecting a next sub-view image as a training object; based on classification results of the selector and the aggregator, the to-be-optimized fine-grained identification model is optimized and adjusted until the optimization is completed to acquire a trained target fine-grained identification model; the target fine-grained identification model is used to perform image identification on a to-be-classified image. By applying the technical schemes of the application, the initial classification model can be trained by using a sample data set consisting of multi-view images of a plurality of multi-view samples. Thus, an efficient fine-grained identification model which can actively select the next view image of the same sample for image identification can be obtained. On the one hand, the efficiency of the model is measured by a number of steps required to obtain reliable prediction results, thus solving the problem that traditional multi-view identification method cannot be directly applied to multi-view fine-grained identification tasks and improving the identification efficiency. On the other hand, this also avoids the problem that the classification results are affected by the fact that a single picture provides less clues for discrimination in fine-grained image identification.

The technical scheme of this application will be described in further detail through the attached drawings and examples.

BRIEF DESCRIPTION OF THE DRAWINGS

The accompanying drawings, which form a part of the specification, illustrate embodiments of the application and together with the description, serve to explain the principles of the application.

The present application can be more clearly understood from the following detailed description with reference to the accompanying drawings, herein.

DETAILED DESCRIPTION

Figure 1:
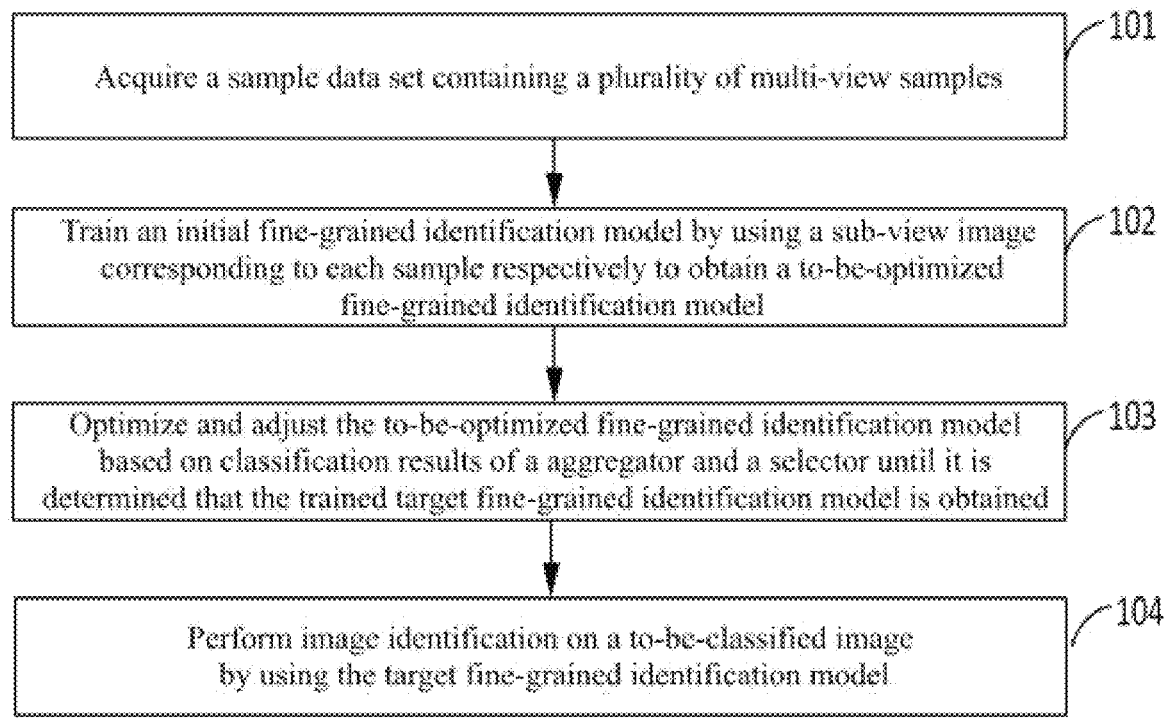
FIG. 1 shows a schematic diagram of a multi-view fine-grained identification method provided by an embodiment of the present application.

Various exemplary embodiments of the present application will now be described in detail with reference to the accompanying drawings. It should be noted that the relative arrangement, numerical expressions and numerical values of components and steps set forth in these examples do not limit the scope of the application unless otherwise specified.

At the same time, it should be understood that for the convenience of description, the dimensions of various parts shown in the drawings are not drawn according to the actual scale relationship.

The following description of at least one exemplary embodiment is merely illustrative in nature and is not intended as any limitation on the application, its application or uses.

Techniques, methods and devices known to those skilled in the relevant fields may not be discussed in detail, but they should be regarded as part of the specification under appropriate circumstances.

It should be noted that similar numbers and letters indicate similar items in the following drawings, so once an item is defined in one drawing, it does not need to be further discussed in subsequent drawings.

In addition, the technical solutions of various embodiments of the application can be combined with each other, but they must be based on the realization of ordinary technicians in the field. When the combination of technical solutions is contradictory or impossible, it should be considered that the combination of technical solutions does not exist and is not within the scope of protection required by the application.

It should be noted that all directional indications (such as up, down, left, right, front, back, etc.) in the embodiment of this application are only used to explain the relative position relationship and movement situation among components in a certain posture (as shown in the accompanying figures). If the certain posture changes, the directional indications will also change accordingly.

A multi-view fine-grained identification method according to an exemplary embodiment of the present application will be described below with reference to FIG. 1 to FIG. 3. It should be noted that the following application scenarios are only shown for the convenience of understanding the spirit and principle of the application, and the implementation of the application is not limited in this aspect. On the contrary, the implementation of the present application can be applied to any applicable scenario.

The present disclosure also provides a multi-view fine-grained identification method, apparatus, electronic device and medium.

FIG. 1 schematically shows a flowchart of a multi-view fine-grained identification method according to an embodiment of the present application. As shown in FIG. 1, the method includes:

At S101, a sample data set containing a plurality of multi-view samples is acquired, herein each sample contains a plurality of sub-view images shot from different perspectives, and each sample is marked with a corresponding category.

At S102, an initial fine-grained identification model is trained by using the sub-view images corresponding to each sample respectively to acquire a to-be-optimized fine-grained identification model, herein the to-be-optimized fine-grained identification model is deployed with an aggregator for aggregating output features and a selector for selecting a next sub-view image as a training object.

At S103, the to-be-optimized fine-grained identification model is optimized and adjusted based on classification results of the aggregator and the selector until it is determined that the optimization is completed to acquire a trained target fine-grained identification model.

At S104, image identification is performed on a to-be-classified image by using the target fine-grained identification model.

Herein, Fine-Grained Visual Classification (FGVC) is dedicated to identify sub-classes of objects belonging to the same category, and its research has achieved remarkable results, even surpassing human experts in many application scenarios, such as identifying vehicles, aircraft, birds and food. Although it has achieved great success, the research on fine-grained visual classification in the past is still limited to the framework of a single perspective. This framework may be enough for coarse-grained image identification with a large inter-category gap, but in fine-grained image identification, a single picture provides less clues for discrimination. For example, people can only distinguish Mercedes-Benz AMG GT models produced in different years by exploring the subtle structural differences of exhaust pipes. Therefore, the single-view pictures without fine-grained discriminant features are doomed to be unable to be accurately classified, which fundamentally limits the theoretical performance of the model.

Furthermore, visual identification is never limited to observing 2D environment and processing static images. The vision algorithm equipped on terminal devices (such as smart phones, smart glasses, etc.) or artificial intelligence terminals (such as intelligent robots) plays a core role in interaction between machines and the environment, and has become one of the focuses of computer vision research. Therefore, under this new trend, in addition to locating discriminant areas in a picture, a never-seen and discriminant area that can be positioned in the real physical world is needed.

Based on the above problems, this application proposes a multi-view fine-grained identification method. In one way, the embodiment of the application is different from the traditional fine-grained visual classification (FGVC). That is to say, compared with the prior art where the research on Fine-Grained Visual Classification is still limited to the framework of single-view pictures, the application can identify other discriminant areas other than single-view pictures, thus solving the problem that single-view pictures without fine-grained discriminant features are doomed to be unable to be accurately classified.

In one way, taking the sample data set being a vehicle image data set as an example, this application needs to firstly collect a fine-grained multi-view cars (MvCars) to test the method of this application. Secondly, the application proposes an efficient fine-grained image identification framework by actively selecting the next view, and measures the efficiency of the model by the number of steps required to obtain reliable prediction results, which solves the problem that the traditional multi-view identification method cannot be directly applied to multi-view fine-grained identification tasks and improves the identification efficiency.024

Herein, for the sample data set proposed by the embodiment of this application, the AFGR sample data set containing N samples can be expressed as $\{X_i, 1_i\}_{i=1}^{N}$, herein $X_i = \{x_i^1, \ldots, x_i^v, \ldots, x_i^V\}$ is an image sequence that describes a group of specific samples from V different perspectives and $l_i$ is their common true label.

Further, in this application, the process of training the initial fine-grained identification model by using the sample data set to acquire the to-be-optimized fine-grained identification model may include the following steps:

At Step 1, the initial fine-grained identification model is acquired.

Herein, in order to deal with a series of related visual inputs, the initial fine-grained identification model constructed in this application is a model using extraction-aggregation structure. In one way, for example, for any image input $x_i^v$, a feature extractor $H(\cdot)$ of CNN in the initial fine-grained identification model can be used to extract the feature of one sub-view image of the sample, i.e. $f_i^v = H(x_i^v)$.

It should be noted that the feature extractors of different sub-view images share weights, so as to achieve the purpose of avoiding adding additional parameters. In one way, considering that an ideal model should take all the information acquired before into consideration, in this embodiment of the application, a circular neural network can be deployed as an aggregator $A(\cdot)$ in the initial fine-grained identification model to aggregate the features of all the seen sub-view images.

In another way, the application deploys two aggregators $A_e(\cdot)$ and $A_s(\cdot)$ which have the same structure but do not share weights and are trained independent of each other in the initial fine-grained identification model. Herein, $A_e(\cdot)$ is used to output a category prediction output global information $e_i^v = A_e(f_i^1, \ldots, f_i^v)$. Further, $A_s(\cdot)$ is the next sub-view image, and is used to output a current state of the currently judged sub-view image, namely $s_i^v = A_s(f_i^1, \ldots, f_i^v)$.

In one way, the classifier $C(\cdot)$ and the selector $P(\cdot)$ in the initial fine-grained identification model can output the predicted category $\hat{l}_i^v = C(e_i^v)$ and a corresponding next view image $x_i^{v+1} = P(s_i^v)$ in parallel.

At Step 2, the initial fine-grained identification model is trained by using the sample data set to acquire the to-be-optimized fine-grained identification model.

In this embodiment, the initial fine-grained identification model can be trained by using the sub-view images corresponding to each sample, respectively, to acquire the to-be-optimized fine-grained identification model deployed with an aggregator for aggregating output features and a selector for selecting the next sub-view image as the training object.

Specifically, the embodiment of the application needs to firstly train the initial fine-grained identification model to acquire the to-be-optimized fine-grained identification model. Herein, the to-be-optimized fine-grained identification model is an identification model that can handle an input sequence with a dynamic length.

In one way, each training iteration is divided into T steps, and the length of the input sequence ranges from 1 to T. At the t-th step, a new sub-view image $x_i^v$ is randomly selected from the unseen view and appended to the input sequence at the (t-1)th step. In this application, T=V is set to ensure that the sequence is not repeated. Therefore, the first loss function optimized by cross entropy can be expressed as:

$$L_{CE}(\hat{l}_i^v, l_i) = l_i \times \log(\hat{l}_i^v).$$

Herein, the process of training the identification model is to get as much discriminant information as possible, and then the more discriminant view will greatly reduce the entropy of the category prediction output distribution. A well-trained classification model tends to provide high confidence prediction, which will lead to little change in prediction probability, especially for small-scale data sets in FGVC scenes, which limits the information fed back by model category prediction.

Therefore, the application further introduces the entropy maximization constraint to acquire a smoother prediction confidence distribution. Specifically, let $p_i^t$ to be the output of the classifier before the softmax function. By introducing a preset temperature, a smoother prediction confidence distribution can be acquired, and can be expressed as:

$$\tilde{l}_{i,j}^v = \frac{\exp(p_{i,j}^v)/t}{\sum_k \exp(p_{i,k}^v)/t}.$$

Herein j and k represent the indexes of the categories of $p_i^v$. Then, in this application, the entropy is maximized by minimizing an Euclidean distance between $\hat{l}_i^v$ and $\tilde{l}_i^v$, and the second loss function is obtained.

$$L_{EM}(\hat{l}_i^v, \tilde{l}_i^v) = |\hat{l}_i^v - \tilde{l}_i^v|^2.$$

Herein, the embodiment of the application can use each sample and the total loss function to train the initial fine-grained identification model to acquire the to-be-optimized fine-grained identification model.

Herein, a total loss function is acquired by a sum of a first loss function and a second loss function, herein the first loss function is the loss function obtained by optimizing the cross entropy and the second loss function is the loss function obtained by performing maximization constraint on the cross entropy.

As an example, the total loss function may be:
$L_{S1} = L_{EM}(\hat{l}_i^v, \tilde{l}_i^v) + L_{EM}(\hat{l}_i^v, \tilde{l}_i^v)$. Herein, the degree of the entropy maximization constraint can be controlled by a parameter temperature t.

At step 3, the to-be-optimized fine-grained identification model is optimized and adjusted based on the classification results of the aggregator and the selector until it is determined that the optimized fine-grained identification model is acquired.

In one way, the embodiment of the application needs to freeze the classifiers in the to-be-optimized fine-grained identification model, namely, $H(\cdot)$, $A_e(\cdot)$ and $C(\cdot)$. That is, the application only optimizes the selector and the aggregator $A_s(\cdot)$ and $P(\cdot)$ for the selection of the next sub-view image.

In one way, the application adopts a strategy gradient method for optimization to realize that the fine-grained identification model subsequently solves the sequential decision-making problem for multiple sub-view images, instead of directly using the classification loss for optimization, because the view selection process is non-differentiable.

In one way, at the t-th step $t(t \geq 2)$, the model will receive the input $x_i^v$, herein v is a perspective corresponding to the t-th step, and is judged by the selector at the (t-1)-th step. Then, the view selection model can be updated according to the change of the prediction probability of the target category. The reward is set to be $r_i^v = l_{i,l_i}^v - \hat{l}_{i,l_i}^{v-1}$. The loss function at the t-th step $t(t \geq 2)$ of the second phase can be expressed as $L_{S2} = L_{PG}(v, \hat{l}_i^{v-1}, \hat{l}_i^v)$.

It is to be noted that for the mainstream strategy gradient algorithm, the total reward for the optimization of the current step is a (weighted) sum of all the step rewards from now on. This is because these methods are designed for scenarios where the selector needs to achieve the ultimate goal through a series of actions. However, the goal of the target fine-grained identification model is to achieve as high accuracy as possible in as few steps as possible, that is, the application aims to achieve the goal of showing the best performance at the current step. Therefore, the application can only use $r_i^v$ in the strategy gradient algorithm in the optimization of the t-th step.

At Step 4, image identification is performed on the to-be-classified image by using the target fine-grained identification model.

For the target fine-grained identification model, the difference from the initial fine-grained identification model is that when $t \geq 2$, the selected sub-view image $v_t$ was given by the selector. In addition, for the loss function of the target fine-grained identification model, the second loss function (i.e., the entropy maximization constraint) needs to be removed. (That is, $L_{S3} = L_{CE}(\hat{l}_i^v, l_i)$). Thus, the target fine-grained identification model is improved under supervision of standard classification (i.e., cross entropy loss), and in particular, the target fine-grained identification model is adjusted according to the sub-view image path determined by the selector.

In the application, a sample data set containing a plurality of multi-view samples can be acquired, herein each sample contains a plurality of sub-view images shot from different perspectives, and each sample is marked with a corresponding category; the initial fine-grained identification model is trained by using the sub-view images corresponding to each sample respectively to acquire a to-be-optimized fine-grained identification model, herein the to-be-optimized fine-grained identification model is deployed with an aggregator for aggregating output features and a selector for selecting the next sub-view image as a training object; based on classification results of the selector and the aggregator, the to-be-optimized fine-grained identification model is optimized and adjusted until it is determined that the optimization is completed to acquire a trained target fine-grained identification model; and the target fine-grained identification model is used to perform image identification on a to-be-classified image. By applying the technical scheme of the application, the initial classification model can be trained by using a sample data set consisting of multi-view images of a plurality of multi-view samples. Thus, an efficient fine-grained identification model can be obtained, and this model can actively select the next view image of the same sample for image identification. On the one hand, efficiency of the model is measured by a number of steps required to obtain reliable prediction results, which solves the problem that traditional multi-view identification methods cannot be directly applied to multi-view fine-grained identification tasks and improves the identification efficiency. On the other hand, it also avoids the problem that the classification results are affected by the fact that a single picture provides less clues for discrimination in fine-grained image identification.

Optionally, in another embodiment of the method based on the application, the training the initial fine-grained identification model by using the sub-view images corresponding to each sample respectively to acquire the to-be-optimized fine-grained identification model includes:

a first sample in the sample data set is acquired;

the initial fine-grained identification model is trained by using the first sub-view image in the first sample to obtain a first identification feature;

based on the first identification feature, the image category of the first sample is predicted at the same time, and a second sub-view image is selected as the next training object;

the initial fine-grained identification model is trained by using the second sub-view image until it is determined that all sub-view images in the first sample have been used to train the initial fine-grained identification model; and the initial fine-grained identification model is trained by using the sub-view images corresponding to the second sample in the sample data set until the to-be-optimized fine-grained identification model is acquired.

Optionally, in another embodiment of the method based on the application, the training the initial fine-grained identification model by using the sub-view images corresponding to each sample respectively to acquire the to-be-optimized fine-grained identification model includes:

the initial fine-grained identification model is trained by using each sample and a total loss function to acquire the to-be-optimized fine-grained identification model; and herein, the total loss function is acquired by a sum of a first loss function and a second loss function, herein the first loss function is a loss function obtained by optimizing cross entropy, and the second loss function is obtained by performing entropy maximization constraint on selector prediction probability distribution.

Optionally, in another embodiment of the method based on the application, the first loss function is obtained by the following formula:

$$L_{CE}(\hat{l}_i^v, l_i) = l_i \times \log(\hat{l}_i^v);$$

herein, $L_{CE}(\hat{l}_i^v, l_i)$ represents the first loss function, v is the first sub-view, $l_i$ is the category of the first sample, and $\hat{l}_i^v$ is the prediction probability distribution of the first sub-view.

Optionally, in another embodiment of the method based on the application, the second loss function is obtained by the following formula:

$$L_{EM}(\hat{l}_i^v, \hat{l}_i^{v'}) = |\hat{l}_i^v - \hat{l}_i^{v'}|^2;$$

wherein, $L_{EM}(\hat{l}_i^v, \hat{l}_i^{v'})$ represents the second loss function, v is the first sub-view, and $\hat{l}_i^{v'}$ is an entropy increasing version of the prediction probability distribution of the first sub-view;

herein, the value $\hat{l}_{i,j}^v$ of the j-th category of $\hat{l}_i^{v'}$ is obtained by the following formula:

$$\hat{l}_{i,j}^v = \frac{\exp(p_{i,j}^v)/t}{\sum_k \exp(p_{i,k}^v)/t};$$

herein, t is a temperature coefficient, $p_{i,j}^v$ is a prediction output of the model for the j-th category based on the first sub-view of the first sample.

Optionally, in another embodiment of the method based on the application, optimizing the aggregator and the selector in the to-be-optimized fine-grained identification model includes:

By using the strategic gradient algorithm, the aggregator and the selector are optimized with a prediction probability distribution of the module for a target category based on a new perspective as a reward.

Figure 2:
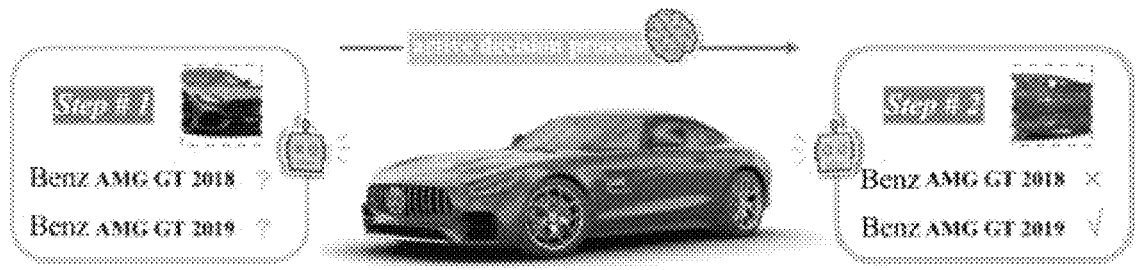
FIG. 2 shows a schematic diagram of a sample data set provided by an embodiment of the present application.

Understandably, as shown in FIG. 2, by taking a sample being vehicles as an example, the multi-view fine-grained identification method proposed in this application embodiment can be realized by collecting a hierarchical, multi-view fine-grained vehicle data set.

Figure 3:
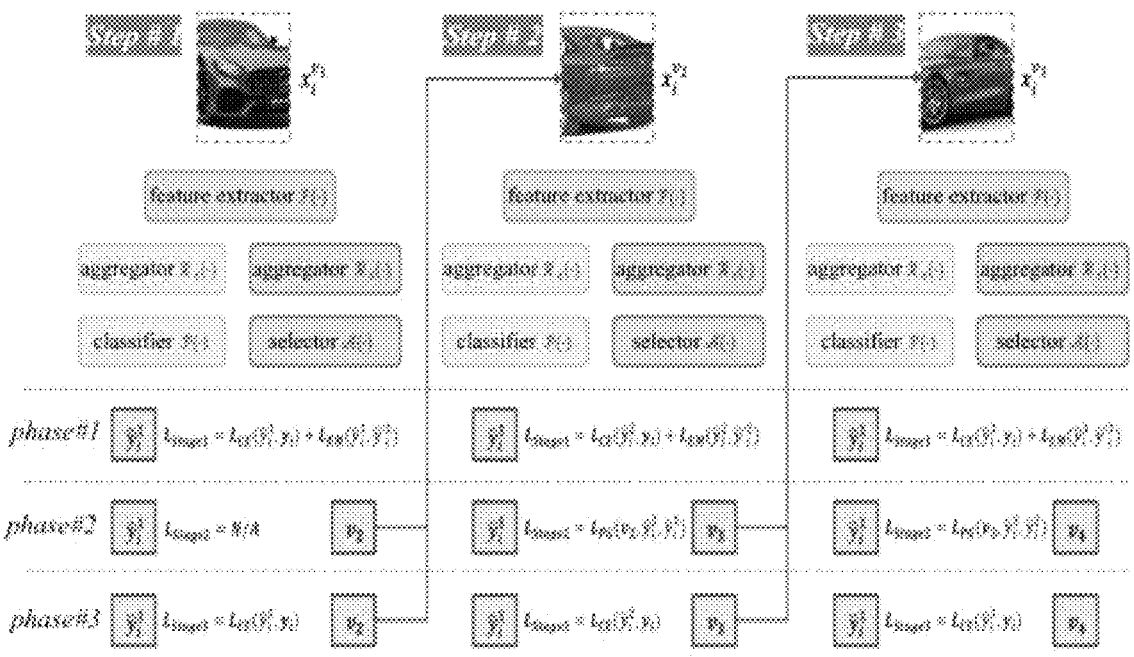
FIG. 3 shows a schematic system architecture diagram of a multi-view fine-grained identification method provided by an embodiment of the present application.

In addition, FIG. 3 shows a system architecture diagram of the multi-view fine-grained identification method proposed in this application. Understandably, the most discriminant sub-views are different for different categories. Therefore, the identification method proposed in this application can help the classification judgment of FGVC by information from multiple different perspectives.

In one way, the embodiment of the application adopts a gradient-based strategy learning framework to realize active perspective selection, so as to carry out efficient image identification. Comprehensive experiments show that the method proposed in this application provides better performance-efficiency ratio than the previous FGVC method and advanced neural network.

By applying the technical scheme of the application, the initial classification model can be trained by using a sample data set consisting of multi-view images of a plurality of multi-view samples. Thus, an efficient fine-grained identification model can be obtained, and this model can actively select the next view image of the same sample for image identification. On the one hand, the efficiency of the model is measured by the number of steps required to obtain reliable prediction results, which solves the problem that traditional multi-view identification methods cannot be directly applied to multi-view fine-grained identification tasks and improves the identification efficiency. On the other hand, it also avoids the problem that the classification results are affected by the fact that a single picture provides less clues for discrimination in fine-grained image identification.

Figure 4:
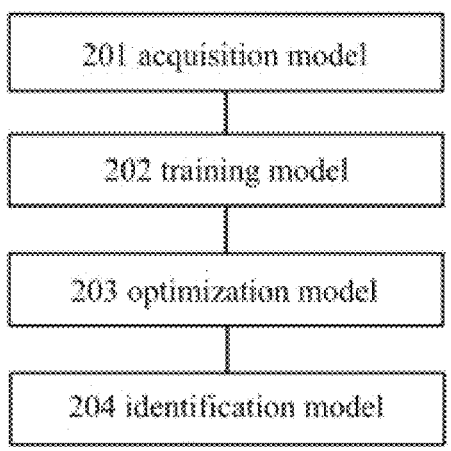
FIG. 4 shows a structural schematic diagram of an electronic apparatus provided by an embodiment of the present application.

Optionally, in another embodiment of the application, as shown in FIG. 4, the application also provides a multi-view fine-grained identification apparatus. The device includes:

an acquisition module 201, configured to acquire a sample data set containing a plurality of multi-view samples, herein each sample contains a plurality of sub-view images shot from different perspectives, and each sample is marked with a corresponding category;

a training module 202, configured to train the initial fine-grained identification model by using the sub-view images corresponding to each sample respectively to acquire the to-be-optimized fine-grained identification model, herein the to-be-optimized fine-grained identification model is deployed with an aggregator for aggregating output features and a selector for selecting the next sub-view image as the training object;

an optimization module 203, configured to optimize and adjust the to-be-optimized fine-grained identification model based on the classification results of the aggregator and the selector until it is determined that the optimization is completed to acquire a trained target fine-grained identification model; and an identification module 204, configured to perform image identification on a to-be-classified image by using the target fine-grained identification model.

By applying the technical scheme of the application, the initial classification model can be trained by using a sample data set consisting of multi-view images of a plurality of multi-view samples. Thus, an efficient fine-grained identification model can be obtained, and this model can actively select the next view image of the same sample for image identification. On the one hand, the efficiency of the model is measured by the number of steps required to obtain reliable prediction results, which solves the problem that traditional multi-view identification methods cannot be directly applied to multi-view fine-grained identification tasks and improves the identification efficiency. On the other hand, it also avoids the problem that the classification results are affected by the fact that a single picture provides less clues for discrimination in fine-grained image identification.

In another embodiment of the present application, the acquisition module 201 is configured to perform the following steps:

a first sample in the sample data set is acquired;

the initial fine-grained identification model is trained by using the first sub-view image in the first sample to obtain a first identification feature;

based on the first identification feature, the image category of the first sample is predicted at the same time, and a second sub-view image is selected as the next training object;

the initial fine-grained identification model is trained by using the second sub-view image until it is determined that all sub-view images in the first sample have been used to train the initial fine-grained identification model; and the initial fine-grained identification model is trained by using the sub-view images corresponding to the second sample in the sample data set until the to-be-optimized fine-grained identification model is acquired.

In another embodiment of the present application, the acquisition module 201 is configured to perform the following steps:

the initial fine-grained identification model is trained by using each sample and the total loss function to acquire the to-be-optimized fine-grained identification model; and herein, the total loss function is acquired by a sum of a first loss function and a second loss function, herein the first loss function is a loss function obtained by optimizing cross entropy, and the second loss function is obtained by performing entropy maximization constraint on selector prediction probability distribution.

In another embodiment of the present application, the acquisition module 201 is configured to perform the following steps:

the first loss function is obtained by the following formula:

$$L_{CE}(\hat{l}_i^v, l_i) = l_i \times \log(\hat{l}_i^v);$$

herein, $L_{CE}(\hat{l}_i^v, l_i)$ represents the first loss function, v is the first sub-view, $l_i$ is the category of the first sample, and $\hat{l}_i^v$ is the prediction probability distribution of the first sub-view.

In another embodiment of the present application, the acquisition module 201 is configured to perform the following steps:

the second loss function is obtained by the following formula:

$$L_{EM}(\hat{l}_i^v, \hat{l}_i^{v\prime}) = |\hat{l}_i^v - \hat{l}_i^{v\prime}|^2;$$

wherein, $L_{EM}(\hat{l}_i^v, \hat{l}_i^{v\prime})$ represents the second loss function, v is the first sub-view, and $\hat{l}_i^v$ is the prediction probability distribution of the first sub-view, and $\hat{l}_i^{v\prime}$ is the entropy increasing version of the prediction probability distribution of the first sub-view;

herein, the value $\hat{l}_{i,j}^v$ of the j-th category of $\hat{l}_i^{v\prime}$ is obtained by the following formula:

$$\hat{l}_{i,j}^v = \frac{\exp(p_{i,j}^v)/t}{\sum_k \exp(p_{i,k}^v)/t};$$

herein, t is a temperature coefficient, $p_{i,j}^v$ is a prediction output of the model for the j-th category based on the first sub-view of the first sample.

In another embodiment of the present application, the acquisition module 201 is configured to perform the following steps:

by using the strategic gradient algorithm, the aggregator and the selector are optimized with a prediction probability distribution of the module for a target category based on a new perspective as a reward.

Figure 5:
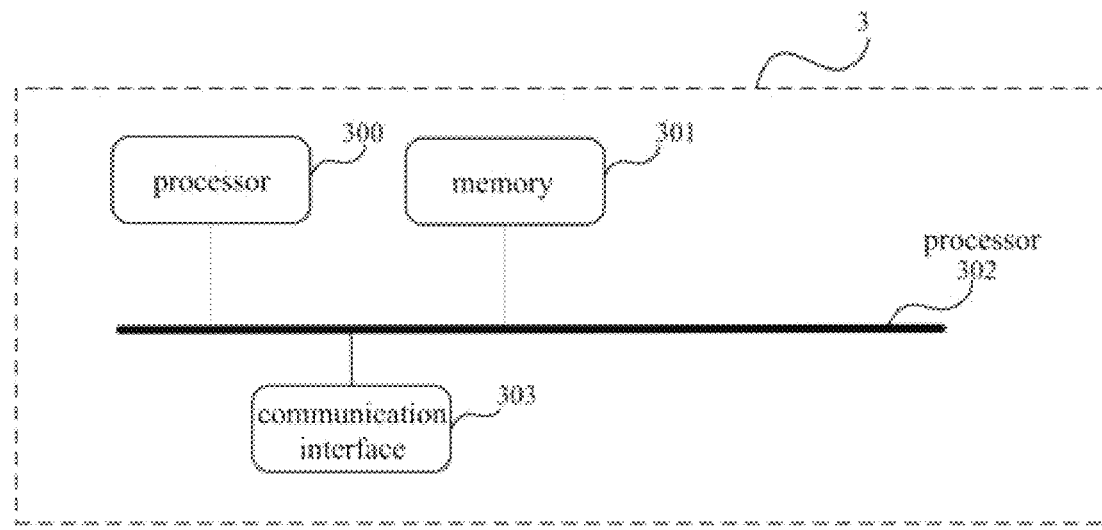
FIG. 5 shows a schematic structural diagram of an electronic device provided by an embodiment of the present application.

The embodiment of the application also provides an electronic device to execute the multi-view fine-grained identification method. Please refer to FIG. 5. FIG. 5 shows a schematic diagram of an electronic device provided by some embodiments of the present application. As shown in FIG. 5, the electronic device 3 includes: a processor 300, a memory 301, a bus 302 and a communication interface 303, herein the processor 300, the communication interface 303 and the memory 301 are connected through the bus 302; the memory 301 stores a computer program that can be run on the processor 300, and when the processor 300 runs the computer program, it executes the multi-view fine-grained identification method provided by any of the aforementioned embodiments of the application.

The memory 301 may include a high-speed RAM (Random Access Memory) or a non-volatile memory, such as at least one disk memory. The communication connection between the network element of the device and at least one other network element is realized through at least one communication interface 303 (they may be wired or wireless), and the Internet, wide area network, local network, metropolitan area network and the like can be used.

The bus 302 may be an ISA bus, a PCI bus or an EISA bus. The bus may be divided into address bus, data bus, control bus, etc. The memory 301 is used to store a program, and the processor 300 executes the program after receiving an execution instruction. The data identification method disclosed in any embodiment of the application can be applied to or realized by the processor 300.

The processor 300 may be an integrated circuit chip with signal processing capability. In the implementation process, each step of the above method can be completed by an integrated logic circuit of hardware or an instruction in the form of software in the processor 300. The processor 300 may be a general processor, including a Central Processing Unit (CPU), a Network Processor (NP), etc.; it may also be a Digital Signal Processor (DSP), an Application Specific Integrated Circuit (ASIC), a Field Programmable Gate Array (FPGA) or other programmable logic devices, discrete gate or transistor logic devices, and discrete hardware components. The methods, steps and logic blocks disclosed in the embodiments of the present application can be realized or executed. The general processor may be a microprocessor or the processor may be any conventional processor, etc. The steps of the method disclosed in the embodiment of the present application may be directly embodied as the completion of execution by a hardware decoding processor, or the completion of execution by a combination of hardware and software modules in the decoding processor. Software modules may be located in random access memory, flash memory, read-only memory, programmable read-only memory or electrically erasable programmable memory, registers and other mature storage media in this field. The storage medium is located in the memory 301, and the processor 300 reads the information in the memory 301 and combines its hardware to complete the steps of the above method.

The electronic device provided by the embodiment of the application has the same inventive concept as the multi-view fine-grained identification methods provided by the embodiment of the application, and has the same beneficial effects as the method adopted, operated or realized.

Figure 6:
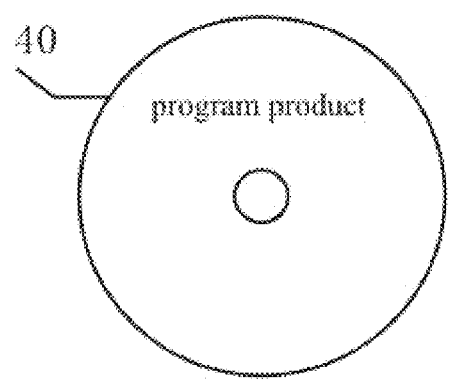
FIG. 6 shows a schematic diagram of a storage medium provided by an embodiment of the present application.

The embodiment of the application also provides a computer-readable storage medium corresponding to the data identification method provided by the aforementioned embodiment. Please refer to FIG. 6, which shows that the computer-readable storage medium is an optical disc 40, and a computer program (i.e., a program product) is stored on the optical disc 40. When the computer program is run by a processor, it will execute the multi-view fine-grained identification method provided by any of the aforementioned embodiments.

It should be noted that examples of the computer-readable storage medium may also include, but are not limited to, Phase Change Memory (PRAM), Static Random Access Memory (SRAM), Dynamic Random Access Memory (DRAM), other types of Random Access Memory (RAM), Read-Only Memory (ROM), Electrically Erasable Programmable Read-Only Memory (EEPROM), flash memory or other optical and magnetic storage media, which will not be described here.

The computer-readable storage medium provided by the above embodiment of the application has the same inventive concept as the data identification method provided by the embodiment of the application, and has the same beneficial effects as the method adopted, run or realized by the stored application program.

It should be noted that:

In the description provided herein, numerous specific details are set forth. However, it is to be understood that embodiments of the present application may be practiced without these specific details. In some instances, well-known structures and techniques have not been shown in detail so as not to obscure the understanding of this specification.

Similarly, it should be understood that in order to simplify the application and help to understand one or more of various inventive aspects, in the above description of the exemplary embodiments of the application, various features of the application are sometimes grouped together into a single embodiment, figure, or description thereof. However, the disclosed method should not be interpreted as reflecting the schematic diagram that the claimed application requires more features than those explicitly recited in each claim. Rather, as reflected in the following claims, the inventive aspects are less than all features of the single embodiment disclosed previously. Therefore, the claims following the specific embodiment are hereby expressly incorporated into this specific embodiment, herein each claim stands as a separate embodiment of this application.

Furthermore, those skilled in the art can understand that although some embodiments described herein include some features but not others included in other embodiments, the combination of features of different embodiments is meant to be within the scope of this application and to form different embodiments. For example, in the following claims, any one of the claimed embodiments may be used in any combination.

The above is only the preferred embodiment of this application, but the protection scope of this application is not limited to this. Any change or replacement that can be easily thought of by a person familiar with this technical field within the technical scope disclosed in this application should be covered by this application. Therefore, the protection scope of this application should be based on the protection scope of the claims.

What is claimed is:

1. A multi-view fine-grained identification method, comprising;
　acquiring a sample data set containing a plurality of multi-view samples, wherein each sample contains a plurality of sub-view images shot from different perspectives, and each sample is marked with a corresponding category;
　training an initial fine-grained identification model by using the sub-view images corresponding to each sample respectively to acquire a to-be-optimized fine-grained identification model, wherein the to-be-optimized fine-grained identification model is deployed with an aggregator for aggregating output features and a selector for selecting a next sub-view image as a training object;
　optimizing and adjusting the to-be-optimized fine-grained identification model based on classification results of the aggregator and the selector until it is determined that the optimization is completed to acquire a trained target fine-grained identification model; and
　performing image identification on the to-be-classified image by using the target fine-grained identification model.

2. The method according to claim 1, wherein the training the initial fine-grained identification model by using the sub-view images corresponding to each sample respectively to acquire the to-be-optimized fine-grained identification model includes:
- acquiring a first sample in the sample data set;
- training the initial fine-grained identification model by using a first sub-view image in the first sample to obtain a first identification feature;
- based on the first identification feature, predicting an image category of the first sample while selecting a second sub-view image as a next training object;
- training the initial fine-grained identification model by using the second sub-view image until it is determined that all sub-view images in the first sample have been used to train the initial fine-grained identification model; and
- training the initial fine-grained identification model by using the sub-view images corresponding to the second sample in the sample data set until the to-be-optimized fine-grained identification model is acquired.

3. The method according to claim 1, wherein the training the initial fine-grained identification model by using the sub-view images corresponding to each sample respectively to acquire the to-be-optimized fine-grained identification model includes:
- training the initial fine-grained identification model by using each sample and a total loss function to acquire the to-be-optimized fine-grained identification model;
- wherein, the total loss function is acquired from a sum of a first loss function and a second loss function, wherein the first loss function is a loss function obtained by optimizing cross entropy, and the second loss function is a loss function obtained by performing entropy maximization constraint on selector prediction probability distribution.

4. The method according to claim 3, wherein the first loss function is obtained by the following formula:

$$L_{CE}(\hat{l}_i^v, l_i) = l_i \times \log(\hat{l}_i^v);$$

wherein, $L_{CE}(\hat{l}_i^v, l_i)$ represents the first loss function, v is the first sub-view, $l_i$ is the category of the first sample, and $\hat{l}_i^v$ is the prediction probability distribution of the first sub-view.

5. The method according to claim 3, wherein the second loss function is obtained by the following formula:

$$L_{EM}(\hat{l}_i^v, \hat{l}_i^{v\prime}) = |\hat{l}_i^v - \hat{l}_i^{v\prime}|^2;$$

wherein, $L_{EM}(\hat{l}_i^v, \hat{l}_i^{v\prime})$ represents the second loss function, v is the first sub-view, $\hat{l}_i^v$ is the prediction probability distribution of the first sub-view, and $\hat{l}_i^{v\prime}$ is an entropy increasing version of the prediction probability distribution of the first sub-view;

wherein, the value $\hat{l}_{i,j}^v$ of the j-th category of $\hat{l}_i^{v\prime}$ is obtained by the following formula:

$$\hat{l}_{i,j}^v = \frac{\exp(p_{i,j}^v)/t}{\sum_k \exp(p_{i,k}^v)/t};$$

wherein, t is a temperature coefficient, $p_{i,j}^v$ is a prediction output of the model for the j-th category based on the first sub-view of the first sample.

6. The method according to claim 1, wherein the method further comprising optimizing the aggregator and the selector in the to-be-optimized fine-grained identification model, and the optimizing the aggregator and the selector in the to-be-optimized fine-grained identification model includes:
- by using a strategic gradient algorithm, optimizing the aggregator and the selector with a prediction probability distribution of the module for a target category based on a new perspective as a reward.

7. An electronic device, comprising:
- a memory, configured to store executable instructions; and,
- a processor, configured to execute the executable instructions with the memory so as to complete operations of the multi-view fine-grained identification method comprising;
- acquiring a sample data set containing a plurality of multi-view samples, wherein each sample contains a plurality of sub-view images shot from different perspectives, and each sample is marked with a corresponding category;
- training an initial fine-grained identification model by using the sub-view images corresponding to each sample respectively to acquire a to-be-optimized fine-grained identification model, wherein the to-be-optimized fine-grained identification model is deployed with an aggregator for aggregating output features and a selector for selecting a next sub-view image as a training object;
- optimizing and adjusting the to-be-optimized fine-grained identification model based on classification results of the aggregator and the selector until it is determined that the optimization is completed to acquire a trained target fine-grained identification model; and
- performing image identification on the to-be-classified image by using the target fine-grained identification model.

8. The electronic device according to claim 7, wherein the training the initial fine-grained identification model by using the sub-view images corresponding to each sample respectively to acquire the to-be-optimized fine-grained identification model includes:
- acquiring a first sample in the sample data set;
- training the initial fine-grained identification model by using a first sub-view image in the first sample to obtain a first identification feature;
- based on the first identification feature, predicting an image category of the first sample while selecting a second sub-view image as a next training object;
- training the initial fine-grained identification model by using the second sub-view image until it is determined that all sub-view images in the first sample have been used to train the initial fine-grained identification model; and
- training the initial fine-grained identification model by using the sub-view images corresponding to the second sample in the sample data set until the to-be-optimized fine-grained identification model is acquired.

9. The electronic device according to claim 7, wherein the training the initial fine-grained identification model by using the sub-view images corresponding to each sample respectively to acquire the to-be-optimized fine-grained identification model includes:
- training the initial fine-grained identification model by using each sample and a total loss function to acquire the to-be-optimized fine-grained identification model;
- wherein, the total loss function is acquired from a sum of a first loss function and a second loss function, wherein the first loss function is a loss function obtained by optimizing cross entropy, and the second loss function is a loss function obtained by performing entropy maximization constraint on selector prediction probability distribution.

10. The electronic device according to claim 9, wherein the first loss function is obtained by the following formula:

$$L_{CE}(\hat{l}_i^v, l_i) = l_i \times \log(\hat{l}_i^v);$$

wherein, $L_{CE}(\hat{l}_i^v, l_i)$ represents the first loss function, v is the first sub-view, $l_i$ is the category of the first sample, and $\hat{l}_i^v$ is the prediction probability distribution of the first sub-view.

11. The electronic device according to claim 9, wherein the second loss function is obtained by the following formula:

$$L_{EM}(\hat{l}_i^v, \hat{l}_i^{v'}) = |\hat{l}_i^v - \hat{l}_i^{v'}|^2;$$

wherein, $L_{EM}(\hat{l}_i^v, \hat{l}_i^{v'})$ represents the second loss function, v is the first sub-view, $\hat{l}_i^v$ is the prediction probability distribution of the first sub-view, and $\hat{l}_i^{v'}$ is an entropy increasing version of the prediction probability distribution of the first sub-view;

wherein, the value $\hat{l}_{i,j}^v$ of the j-th category of $\hat{l}_i^{v'}$ is obtained by the following formula:

$$\hat{l}_{i,j}^v = \frac{\exp(p_{i,j}^v)/t}{\sum_k \exp(p_{i,k}^v)/t};$$

wherein, t is a temperature coefficient, $p_{i,j}^v$ is a prediction output of the model for the j-th category based on the first sub-view of the first sample.

12. The electronic device according to claim 7, wherein the method further comprising optimizing the aggregator and the selector in the to-be-optimized fine-grained identification model, and the optimizing the aggregator and the selector in the to-be-optimized fine-grained identification model includes:

by using a strategic gradient algorithm, optimizing the aggregator and the selector with a prediction probability distribution of the module for a target category based on a new perspective as a reward.

13. A non-transitory computer-readable storage medium, configured to store computer-readable instructions, wherein the instructions, when executed, perform the operations of the multi-view fine-grained identification method comprising;

acquiring a sample data set containing a plurality of multi-view samples, wherein each sample contains a plurality of sub-view images shot from different perspectives, and each sample is marked with a corresponding category;

training an initial fine-grained identification model by using the sub-view images corresponding to each sample respectively to acquire a to-be-optimized fine-grained identification model, wherein the to-be-optimized fine-grained identification model is deployed with an aggregator for aggregating output features and a selector for selecting a next sub-view image as a training object;

optimizing and adjusting the to-be-optimized fine-grained identification model based on classification results of the aggregator and the selector until it is determined that the optimization is completed to acquire a trained target fine-grained identification model; and performing image identification on the to-be-classified image by using the target fine-grained identification model.

14. The non-transitory computer-readable storage medium according to claim 13, wherein the training the initial fine-grained identification model by using the sub-view images corresponding to each sample respectively to acquire the to-be-optimized fine-grained identification model includes:

acquiring a first sample in the sample data set;

training the initial fine-grained identification model by using a first sub-view image in the first sample to obtain a first identification feature;

based on the first identification feature, predicting an image category of the first sample while selecting a second sub-view image as a next training object;

training the initial fine-grained identification model by using the second sub-view image until it is determined that all sub-view images in the first sample have been used to train the initial fine-grained identification model; and training the initial fine-grained identification model by using the sub-view images corresponding to the second sample in the sample data set until the to-be-optimized fine-grained identification model is acquired.

15. The non-transitory computer-readable storage medium according to claim 13, wherein the training the initial fine-grained identification model by using the sub-view images corresponding to each sample respectively to acquire the to-be-optimized fine-grained identification model includes:

training the initial fine-grained identification model by using each sample and a total loss function to acquire the to-be-optimized fine-grained identification model;

wherein, the total loss function is acquired from a sum of a first loss function and a second loss function, wherein the first loss function is a loss function obtained by optimizing cross entropy, and the second loss function is a loss function obtained by performing entropy maximization constraint on selector prediction probability distribution.

16. The non-transitory computer-readable storage medium according to claim 15, wherein the first loss function is obtained by the following formula:

$$L_{CE}(\hat{l}_i^v, l_i) = l_i \times \log(\hat{l}_i^v);$$

wherein, $L_{CE}(\hat{l}_i^v, l_i)$ represents the first loss function, v is the first sub-view, $l_i$ is the category of the first sample, and $\hat{l}_i^v$ is the prediction probability distribution of the first sub-view.

17. The computer-readable storage medium according to claim 15, wherein the second loss function is obtained by the following formula:

$$L_{EM}(\hat{l}_i^v, \hat{l}_i^{v'}) = |\hat{l}_i^v - \hat{l}_i^{v'}|^2;$$

wherein, $L_{EM}(\hat{l}_i^v, \hat{l}_i^{v'})$ represents the second loss function, v is the first sub-view, $\hat{l}_i^v$ is the prediction probability distribution of the first sub-view, and $\hat{l}_i^{v'}$ is an entropy increasing version of the prediction probability distribution of the first sub-view;

wherein, the value $\hat{l}_{i,j}^v$ of the j-th category of $\hat{l}_i^{v'}$ is obtained by the following formula:

$$\hat{l}_{i,j}^v = \frac{\exp(p_{i,j}^v)/t}{\sum_k \exp(p_{i,k}^v)/t};$$

wherein, t is a temperature coefficient, $p_{i,j}^v$ is a prediction output of the model for the j-th category based on the first sub-view of the first sample.

18. The non-transitory computer-readable storage medium according to claim 13, wherein the method further comprising optimizing the aggregator and the selector in the to-be-optimized fine-grained identification model, and
the optimizing the aggregator and the selector in the to-be-optimized fine-grained identification model includes:
by using a strategic gradient algorithm, optimizing the aggregator and the selector with a prediction probability distribution of the module for a target category based on a new perspective as a reward.

* * * * *